US009856812B2

(12) United States Patent
Garagnani et al.

(10) Patent No.: US 9,856,812 B2
(45) Date of Patent: Jan. 2, 2018

(54) METHOD FOR RECOGNISING THE TYPE OF FUEL ACTUALLY USED IN AN INTERNAL COMBUSTION ENGINE

(71) Applicant: Magneti Marelli S.p.A., Corbetta (IT)

(72) Inventors: Nicola Garagnani, Crespellano (IT); Riccardo Lanzoni, Imola (IT); Marco Pastorelli, Perugia (IT); Filippo Cavanna, Bologna (IT)

(73) Assignee: Magneti Marelli S.p.A., Corbetta (IT)

( * ) Notice: Subject to any disclaimer, the term of this patent is extended or adjusted under 35 U.S.C. 154(b) by 435 days.

(21) Appl. No.: 14/064,394

(22) Filed: Oct. 28, 2013

(65) Prior Publication Data

US 2014/0180562 A1 Jun. 26, 2014

(30) Foreign Application Priority Data

Oct. 29, 2012 (IT) .............................. BO2012A0591

(51) Int. Cl.
*G06F 19/00* (2011.01)
*F02D 41/14* (2006.01)
(Continued)

(52) U.S. Cl.
CPC ....... *F02D 41/1493* (2013.01); *F02D 35/027* (2013.01); *F02D 41/0025* (2013.01);
(Continued)

(58) Field of Classification Search
CPC ............. F02D 41/1493; F02D 41/1475; F02D 41/0025; F02D 41/1497; F02D 2200/025;
(Continued)

(56) References Cited

U.S. PATENT DOCUMENTS 4,617,895 A * 10/1986 Sakakibara ........... F02P 5/1523 123/406.38
2010/0224168 A1* 9/2010 Yasuhara .............. F02D 35/028 123/406.23
2010/0228463 A1* 9/2010 Kweon ................. F02D 35/023 701/103
(Continued)

FOREIGN PATENT DOCUMENTS

DE 10 2007 034189 A1 1/2009
DE 11 2008 002129 T5 6/2010
(Continued)

OTHER PUBLICATIONS

Italian Search Report dated Sep. 6, 2013.

*Primary Examiner* — Lindsay Low
*Assistant Examiner* — Omar Morales
(74) *Attorney, Agent, or Firm* — Howard & Howard Attorneys PLLC

(57) ABSTRACT

A method for recognizing the type of fuel actually used in an internal combustion engine; the recognition method includes the steps of: sensing the intensity of the vibrations generated by the internal combustion engine within a measurement time window; determining the value of at least one synthetic index by processing the intensity of the vibrations generated by the internal combustion engine within the measurement time window; comparing the synthetic index with at least one predetermined comparison quantity; and recognizing the type of fuel actually used as a function of the comparison of the synthetic index to the comparison quantity; and forcedly altering, when detecting the intensity of the vibrations, the engine control with respect to the normal standard engine control, so as to enhance the behavioral differences of the different types of fuel that can be used by the internal combustion engine.

15 Claims, 1 Drawing Sheet

(51) Int. Cl.

| | |
|---|---|
| ***F02D 35/02*** | (2006.01) |
| ***F02D 41/00*** | (2006.01) |
| *F02D 41/28* | (2006.01) |

(52) U.S. Cl.
CPC ...... *F02D 41/1475* (2013.01); *F02D 41/1497* (2013.01); *F02D 2041/288* (2013.01); *F02D 2200/025* (2013.01); *F02D 2200/0612* (2013.01)

(58) Field of Classification Search
CPC ........... F02D 2200/0612; F02D 35/027; F02D 2041/288; F02D 19/0655; G01M 15/12
USPC ........ 123/299, 300, 304, 575–578; 73/23.28, 73/23.31, 35.02, 114.01
See application file for complete search history.

(56) References Cited

U.S. PATENT DOCUMENTS

| | | | | |
|---|---|---|---|---|
| 2012/0031374 A1* | 2/2012 | Hokuto | F02D 35/027 | 123/445 |
| 2013/0067990 A1* | 3/2013 | Sgatti | F02D 41/0025 | 73/23.31 |

FOREIGN PATENT DOCUMENTS

| | | | | |
|---|---|---|---|---|
| DE | 10 2009 029011 A1 | 3/2011 | | |
| DE | 10 2009 029057 A1 | 3/2011 | | |
| IT | BO2011A000122 A1 | 9/2012 | | |
| JP | DE 112008002129 * | 1/2013 | | F02D 35/027 |
| WO | 0186231 A1 | 11/2001 | | |

* cited by examiner

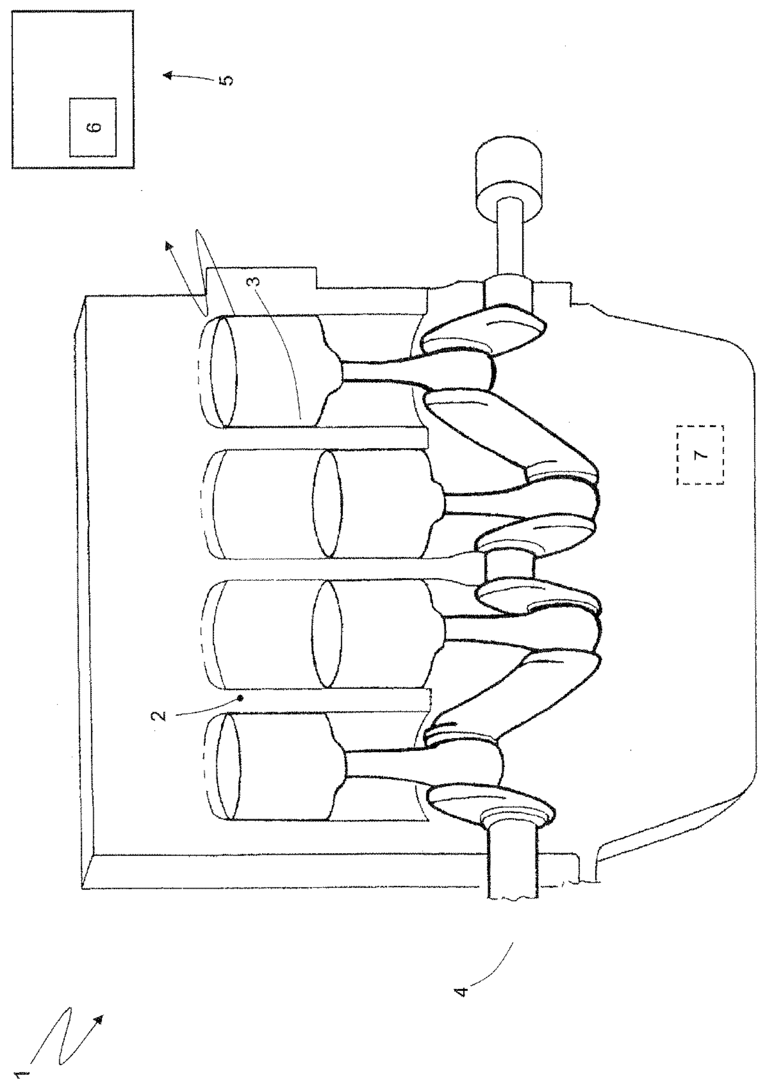
1
2
3
4
5
6
7

METHOD FOR RECOGNISING THE TYPE OF FUEL ACTUALLY USED IN AN INTERNAL COMBUSTION ENGINE

REFERENCE TO RELATED APPLICATION

This application is based upon and claims priority to published Italian Patent Application BO2012A 00591 filed on Oct. 29, 2012

BACKGROUND OF THE INVENTION

1. Field of Invention

The present invention relates to a method for recognising the type of fuel actually used in an internal combustion engine.

2. Description of Related Art

For many years, internal combustion engines with controlled ignition have been fed with different types of liquid fuel, such as pure petrol, hydrated alcohol, or a mixture of petrol and alcohol. Importantly, these different types of liquid fuels each have different characteristics, such as different stoichiometric air/fuel ratios. Recently, even modern diesel engines can be fed with fuels other than pure diesel which consist of a mixture of diesel and fuels from bio-mass, such as vegetable oils like rapeseed oil (commercially known as "biodiesel").

Accordingly, it is important for the electronic control unit of the engine to know the type of fuel that is actually used by the internal combustion engine so as to optimise the combustion control as a function of the features of the fuel actually used. For example, it is essential to know the actual stoichiometric air/fuel ratio of the fuel in order to minimise the generation of pollutants. Further, it is very useful to know the volatility of the fuel to ensure a proper "cold" start of the internal combustion engine.

Several methods for recognising the type of fuel are known in the art which are based on information provided by a lambda probe in the exhaust. However, there is a need in the art to be able to recognise the type of fuel without the use of information provided by the lambda probe in the exhaust. Specifically, it is important to be able to recognise the type of fuel when in "recovery" mode (when the lambda probe is not working properly). Further, it is desirable to increase the recognition reliability by comparing the recognition of the type of fuel provided by the lambda probe with another independent recognition source.

The published Italian patent application BO2011A000122 (corresponding to published U.S. patent application US2013067990) describes a method for recognising the type of fuel actually used in an internal combustion engine, comprising the steps of: sensing the intensity of vibrations generated by the internal combustion engine in a measurement time window; determining the value of a synthetic index by processing the intensity of the vibrations generated by the internal combustion engine in the measurement time window; comparing the synthetic index with a predetermined comparison quantity; and recognising the type of fuel as a function of the comparison of the synthetic index to the comparison quantity.

The recognition method described in published Italian patent application BO2011A000122 allows the type of fuel actually used by the internal combustion engine to be estimated with a high enough accuracy and reliability. In addition, this recognition method is completely independent of the information provided by the lambda probe in the exhaust of the internal combustion engine. However, when using the recognition method described in published Italian patent application BO2011A000122, it is possible that the recognition of the type of fuel actually used by the internal combustion engine is relatively uncertain (i.e. not completely reliable). The published U.S. patent application US2012031374 describes a method for recognising the type of fuel actually used in an internal combustion engine as a function of a detonation value measured with a detonation sensor.

SUMMARY OF THE INVENTION

The object of the present invention is to provide a method for recognising the type of fuel actually used in an internal combustion engine that is free from the drawbacks described above, is easy and cost-effective to be implemented, and reliably allows a certain recognition of the type of fuel actually used by the internal combustion engine to be obtained.

More specifically, the present invention overcomes the deficiencies in the related art in a method for recognising the type of fuel actually used in an internal combustion engine. The method includes the steps of sensing the intensity of the vibrations generated by the internal combustion engine within a measurement time window, determining the type of fuel actually used as a function of the intensity of the vibrations generated by the internal combustion engine within the measurement time window, and forcedly altering, when detecting the intensity of the vibrations, the engine control using, as a reference, an abnormal stoichiometric air/fuel ratio, which is different from the stoichiometric air/fuel ratios of the fuels that can be used by the internal combustion engine, in order to enhance the behavioural differences of the different types of fuel that can be used by the internal combustion engine.

BRIEF DESCRIPTION OF THE DRAWINGS

The present invention will now be described with reference to the accompanying drawing, which shows a non-limiting embodiment example thereof. Specifically, the accompanying FIGURE is a diagrammatic view of an internal combustion engine provided with a control unit which implements the method for recognising the type of fuel actually used.

DETAILED DESCRIPTION OF THE INVENTION

In the accompanying FIG. 1, reference numeral 1 indicates as a whole an internal combustion engine having four inline cylinders 2. Each cylinder 2 accommodates a respective piston 3 mechanically connected via a connecting rod to a driving shaft 4 to transmit the force generated by combustion within the cylinder 2 to the driving shaft 4.

The internal combustion engine 1 is controlled by an electronic control unit 5 (normally called an "ECU") which is arranged in the vicinity of the internal combustion engine 1 and is normally housed inside the engine compartment of the vehicle (not shown). The electronic control unit 5 includes a microphone 6 (an acoustic-type pressure sensor 6), which is housed inside the control unit 5 and is adapted to detect the intensity of the noise generated by the internal combustion engine 1 (i.e., it is adapted to detect the intensity of the acoustic pressure waves generated by the internal combustion engine 1).

The electronic control unit 5 detects, by microphone 6, the intensity S of the noise generated by the internal combustion engine 1 (i.e. of vibrations generated by the internal combustion engine 1) in a predetermined amplitude measurement time window (normally of the order 1-5 tenths of a second). In the electronic control unit 5, the intensity S of the noise generated by the internal combustion engine 1 is digitized using a sampling at a relatively high frequency (of the order of 50 kHz). Thereafter, the electronic control unit 5 determines the value of at least one synthetic index I by elaborating the intensity S of the noise generated by the internal combustion engine 1 in the measurement time window. Specifically, the value of the synthetic index I is calculated as a function of the intensity S of the noise generated by the internal combustion engine 1 in the measurement time window in such a way that the synthetic index I is a "synthesis" of the intensity S of the noise generated by the internal combustion engine 1 in the measurement time window. The synthetic index I is compared with at least one predetermined comparison quantity TH and then the type of fuel actually used by the internal combustion engine 1 is recognised as a function of the comparison of the synthetic index I to the comparison quantity TH. The comparison quantity TH may be determined experimentally during a calibration step which is carried out by feeding different fuels having known features to the internal combustion engine 1 suitably provided with laboratory instruments.

Normally, the comparison quantity TH is associated with a specific recognition operating point of the internal combustion engine 1; in other words, the comparison quantity TH is determined in the recognition operating point and is therefore valid only at or in the vicinity of the recognition operating point. The operating point of engine 1 (also called engine point) is generally identified by a value of the engine speed and a load value. The load value is provided by the suction pressure or by the suction efficiency (i.e. the ratio between the amount of air actually drawn and the maximum amount of air that can be drawn). The comparison of the synthetic index I to the comparison quantity TH is only made when the current operating point of the internal combustion engine 1 is in a neighbourhood of the recognition operating point, i.e. when the difference between the current parameters (engine speed and load) and the recognition operating point parameters is "small" (i.e. lower, in absolute value, than a threshold).

During the system calibration, the recognition operating point is chosen in such a way as to optimise the differences between different fuels; specifically, the differences that can be perceived in the noise generated by the internal combustion engine 1 according to the type of fuel used are less apparent in some operating points and more apparent in other operating points. In order to simplify the recognition of the type of fuel used, it is clear that it is convenient to choose the recognition operating point in an area where the differences between different fuels are maximum. In order to increase the possibility to carry out the recognition, it is possible to use multiple comparison quantities TH, each of which is associated with its own recognition operating point different from recognition operating points of the other comparison quantities TH.

When the current operating point of the internal combustion engine 1 near the recognition operating point, and a recognition of the type of fuel actually used by the internal combustion engine 1 is to be made, the engine control is forcedly altered with respect to the normal standard engine control so as to amplify the behavioural differences of the different types of fuel that can be used by the internal combustion engine 1. In other words, in order to perform the recognition of the type of fuel actually used by the internal combustion engine 1 with higher reliability, rather than using the normal standard engine control (which is intended to generate the driving torque required by the driver, minimising the generation of pollutants and minimising fuel consumption), a special engine control is used which is intended to enhance the behavioural differences of the different types of fuel that can be used by the internal combustion engine 1 without excessively affecting the operating regularity.

According to one embodiment, in order to perform a recognition of the type of fuel actually used by the internal combustion engine 1, the engine control is forcedly altered (compared to the normal standard engine control) to use, as a reference, an abnormal stoichiometric air/fuel ratio that is different from the stoichiometric air/fuel ratios of the fuels that can be used by the internal combustion engine 1. For example, if the fuels that can be used by the internal combustion engine 1 are E22 (mixture consisting of 22% ethanol and 78% petrol) and E100 (mixture consisting of 100% ethanol, i.e. pure ethanol), the stoichiometric air/fuel ratio of fuel E22 is equal to 13.5, while the stoichiometric air/fuel ratio of fuel E100 is equal to 9. Accordingly, the engine control operates using, as a reference, a stoichiometric air/fuel ratio equal to 13.5 if fuel E22 is used, or using, as a reference, a stoichiometric air/fuel ratio equal to 9 if fuel E100 is used. In order to perform a recognition of the type of fuel actually used by the internal combustion engine 1, the engine control uses, as a reference, an abnormal stoichiometric air/fuel ratio that is different from both the stoichiometric air/fuel ratio of fuel E22 and the stoichiometric air/fuel ratio of fuel E100. For example, the engine control may use as a reference an abnormal stoichiometric air/fuel ratio from 10 to 12 for the short time during which the intensity S of the noise generated by the internal combustion engine 1 is acquired (i.e. the measurement time window).

When the engine control uses, as a reference, the abnormal stoichiometric air/fuel ratio (e.g. equal to 11), if the fuel that is actually used by the internal combustion engine 1 is E22, then there would be a rich combustion, i.e. in excess of fuel (the actual coefficient X, which indicates the relationship between the air/fuel ratio and the actual stoichiometric air/fuel ratio, would be about 0.81). Similarly, if the fuel that is actually used by the internal combustion engine 1 is E100, then there would be a lean combustion, i.e. in shortage of fuel (the actual coefficient X would be about 1.2). In other words, when the engine control uses as a reference the abnormal stoichiometric air/fuel ratio, and the amount of fuel being injected remains the same, a higher driving torque is generated (therefore, greater power and more energy involved which results in stronger noise). If the fuel that is actually used by the internal combustion engine 1 is E22, a lower driving torque is generated (therefore, lower power and less energy involved which results in weaker noise) when the fuel that is actually used by the internal combustion engine 1 is E100. It is therefore clear that the use of the abnormal stoichiometric air/fuel ratio enhances the differences of noise determined by two types of fuel for the short time during which the intensity S of the noise generated by the internal combustion engine 1 is acquired (i.e. the measurement time window).

To summarise, when the current operating point of the internal combustion engine 1 near the recognition operating point and a recognition of the type of fuel actually used by the internal combustion engine 1 is to be performed, the engine control is forcedly altered (compared to the normal standard engine control) to amplify the behavioural differences of the different types of fuel used by the internal combustion engine 1 by using an air/fuel ratio for the engine control that is different from the abnormal stoichiometric air/fuel ratios of the fuels that can be used by the internal combustion engine 1.

In one embodiment, the intensity S of the noise generated by the internal combustion engine 1 in the measurement time window is previously filtered with a band-pass filter or by using a filter with "weighting A" (a type of equalisation that boosts the frequencies more perceived by the human being and cuts the less audible ones). By way of example, the filtering band of the band-pass filter can be between 10 Hz and 16 KHz (i.e., the band-pass filter attenuates the frequencies below 10 Hz and higher than 16 kHz and enhances the frequencies between 10 Hz and 16 KHz).

In a first simplified (and more robust) recognition mode, the electronic control unit 5 recognises a first type of fuel if the synthetic index I is either higher or lower than the comparison quantity TH, and recognises a second type of fuel if the synthetic index I is correspondingly lower or higher than the comparison quantity TH. This first simplified mode is of the "binary" type, i.e. it only provides the choice between two different types of fuel as a function of the comparison of the synthetic index I to the comparison quantity TH. In a second, more refined (and potentially less robust) recognition mode, the electronic control unit 5 recognises the type of fuel by an interpolation performed as a function of the comparison of the synthetic index I to the comparison quantity TH. In this second, more refined recognition mode, at least two comparison quantities TH are normally used, which delimit a window within which the synthetic index I is, and the fuel type is recognised by an interpolation between the types associated with the two comparison quantities TH.

In one embodiment, the electronic control unit 5 calculates the synthetic index I directly as a function of the variation in time of the intensity S of the noise generated by the internal combustion engine 1, and then calculates the value of the synthetic index I in the time domain. In particular, after filtering, the absolute value of the intensity S of the noise generated by the internal combustion engine 1 is integrated in time within the measurement time window in order to determine the synthetic index I. In other words, the synthetic index I is equal to the integral over time within the measurement time window of the absolute value of the intensity S of the noise generated by the internal combustion engine 1 which has been previously filtered. The intensity S of the noise generated by the internal combustion engine 1 is a function of the power developed by the combustion in the cylinders 2 of the internal combustion engine 1. Accordingly, the synthetic index I is a function of the energy generated by the combustion in the cylinders 2 of the internal combustion engine 1 during the measurement time window.

In another embodiment, the electronic control unit 5 calculates the FFT (Fast Fourier Transform) of the intensity S of the noise generated by the internal combustion engine 1 in the measurement time window, and then calculates the value of the synthetic index I in the frequency domain as a function of the amplitude of at least one harmonic of the FFT. However, this embodiment requires a much higher computing power since the FFT calculation is much more complex than the simple calculation of a time integral.

In the embodiment described above, the sensor used by the electronic control unit 5 is a microphone 6 and it detects the intensity S of the noise generated by the internal combustion engine 1. In an equivalent embodiment, the sensor used by the electronic control unit 5 is an accelerometer 7 which is directly mounted on the internal combustion engine 1 and detects the intensity S of the mechanical vibrations generated by the internal combustion engine 1. In other words, in order to recognise the type of fuel actually used, the electronic control unit 5 uses the intensity S of vibrations generated by the internal combustion engine 1, and such vibrations can may be acoustic (sound) and thus detected by microphone 6, or mechanical and thus detected by accelerometer 7. It should be noted that the mechanical vibrations generated by the internal combustion engine 1 are closely related with the noise generated by the internal combustion engine 1, as they are both originated by the same physical phenomena created by the combustion of fuel in the cylinders 2; therefore, considering the mechanical vibrations generated by the internal combustion engine 1 is sufficiently equivalent to considering the noise generated by the internal combustion engine 1.

According to one embodiment, the intensity S of the mechanical vibrations measured by accelerometer 7 in the measurement time window is previously filtered by a band-pass filter which acts in the window 3-12 kHz (i.e., the band-pass filter attenuates frequencies lower than 3 kHz and higher than 12 kHz and enhances frequencies between 3-12 kHz). This recognition method can be used when the lambda probe in the exhaust of the internal combustion engine 1 does not provide reliable information, or when the internal combustion engine 1 is cold is immediately following a cold engine start. In this way, it is possible to perform an initial recognition of the type of fuel actually used by the internal combustion engine 1 immediately after the cold start of the internal combustion engine 1 itself, and thus without waiting the time (several seconds) needed to bring the lambda probe to temperature.

Furthermore, the recognition method described above can be used in "recovery" mode when the lambda probe in the exhaust of the internal combustion engine 1 is not working properly; in other words, the type of fuel actually used is normally recognised using the information provided by the lambda probe, and in case of malfunction of the lambda probe, the type of fuel actually used is recognised according to the recognition method described above, which does not provide for the use of the information provided by the lambda probe. Finally, this recognition method can be used as a comparison sample with the same recognition performed using the information provided by the lambda probe so as to increase the recognition reliability.

The recognition method described above has numerous advantages as it is also easily implemented in an already existing electronic control unit 5 and does not require a high additional computational burden (particularly when the synthetic index I is calculated using an integration over time of the intensity S of the noise generated by engine 1). Furthermore, the recognition method described above allows the type of fuel actually used by the internal combustion engine 1 to be estimated with and very high accuracy and reliability. Finally, the recognition method described above is completely independent of the information provided by the lambda probe in the exhaust of the internal combustion engine 1 and therefore it can be used both when the lambda sensor is not working properly (i.e., when the lambda probe is cold or faulty) and as a comparison sample for the same recognition performed using the information provided by the lambda sensor.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A method for recognising the type of fuel actually used in an internal combustion engine (1) provided with a lambda probe in an exhaust; the recognition method comprises the steps of:

operating, during the normal functioning, an engine control of the engine (1) using, as a reference, a first stoichiometric air/fuel ratio if a first fuel is actually used or a second stoichiometric air/fuel ratio if a second fuel is actually used;

sensing the intensity (S) of vibrations generated by the internal combustion engine (1) within a measurement time window;

determining the type of fuel actually used as a function of the intensity (S) of the vibrations generated by the internal combustion engine (1) within the measurement time window and without using the information provided by the lambda probe in the exhaust of the internal combustion engine (1); and forcedly altering, only when detecting the intensity (S) of the vibrations, the engine control using, as a reference, a third abnormal stoichiometric air/fuel ratio, which is different from the first and second stoichiometric air/fuel ratios of the first and second fuels that can be used by the internal combustion engine (1), in order to enhance behavioural differences of the first and second fuels that can be used by the internal combustion engine (1);

wherein, when the engine control uses as a reference the third abnormal stoichiometric air/fuel ratio, if the fuel that is actually used by the internal combustion engine (1) is the first fuel, then there would be a rich combustion, i.e. in excess of fuel, while if the fuel that is actually used by the internal combustion engine (1) is the second fuel, then there would be a lean combustion, i.e. in shortage of fuel.

2. The recognition method as set forth in claim 1, wherein the abnormal stoichiometric air/fuel ratio is within a range delimited by the stoichiometric air/fuel ratios of the fuels that can be used by the internal combustion engine (1).

3. The recognition method as set forth in claim 2, wherein the fuels that can be used by the internal combustion engine (1) are E22 and E100, and the abnormal stoichiometric air/fuel ratio is from 10 to 12.

4. The recognition method as set forth in claim 1 further including the steps of:

identifying at least one recognition operating point of the internal combustion engine (1); and detecting the intensity (S) of the vibrations generated by the internal combustion engine (1) only when a current operating point of the internal combustion engine (1) coincides with the recognition operating point.

5. The recognition method as set forth in claim 1, wherein the step of recognising the type of fuel actually used further includes the steps of:

determining a value of at least one synthetic index (I) as a function of the intensity (S) of the vibrations generated by the internal combustion engine (1) within the measurement time window; and recognising the type of fuel actually used as a function of the synthetic index (I).

6. The recognition method as set forth in claim 5, wherein the step of recognising the type of fuel actually used further includes the steps of:

comparing the synthetic index (I) with at least one predetermined comparison quantity (TH); and recognising the type of fuel actually used as a function of the comparison of the synthetic index (I) to the comparison quantity (TH).

7. The recognition method as set forth in claim 6, wherein the step of recognising the type of fuel actually used further includes the steps of:

recognising a first fuel type if the synthetic index (I) is higher than the comparison quantity (TH); and recognising a second fuel type if the synthetic index (I) is lower than the comparison quantity (TH).

8. The recognition method as set forth in claim 6, wherein the step of recognising the type of fuel actually used further includes the step of performing an interpolation.

9. The recognition method as set forth in claim 5, wherein the step of determining the value of the synthetic index (I) further includes the steps of:

calculating a FFT of the intensity (S) of the vibrations generated by the internal combustion engine (1) within the measurement time window; and calculating the value of the synthetic index (I) as a function of the amplitude of at least one harmonic of the FFT.

10. The recognition method as set forth in claim 5, wherein the synthetic index (I) is directly determined as a function of a variation in time of the intensity (S) of the vibrations generated by the internal combustion engine (1).

11. The recognition method as set forth in claim 10, wherein the synthetic index (I) is equal to an integral in time, within the measurement time window, of the intensity (S) of noise generated by the internal combustion engine (1), which has been previously filtered.

12. The recognition method as set forth in claim 5 further including the step of filtering the intensity (S) of noise generated by the internal combustion engine (1) with a band-pass filter before determining the value of the synthetic index (I).

13. The recognition method as set forth in claim 1, wherein the step of sensing is performed by a microphone (6) which detects the intensity (S) of noise generated by the internal combustion engine (1).

14. The recognition method as set forth in claim 1, wherein the step of sensing is performed by an accelerometer (7) which detects the intensity (S) of mechanical vibrations generated by the internal combustion engine (1).

15. The recognition method as set forth in claim 1, wherein the measurement time window is of the order 1-5 tenths of a second.

* * * * *